April 4, 1967  A. A. D'AUDIFFRET ETAL  3,312,284
APPARATUS FOR CLEANING INFILTRATION TYPE WATER COLLECTOR
Filed Oct. 9, 1963  3 Sheets-Sheet 1

INVENTOR.
ADOLPHE A. D'AUDIFFRET
JOHN J. TOMCIK

April 4, 1967  A. A. D'AUDIFFRET ET AL  3,312,284
APPARATUS FOR CLEANING INFILTRATION TYPE WATER COLLECTOR
Filed Oct. 9, 1963  3 Sheets-Sheet 2

INVENTORS
ADOLPHE A. D'AUDIFFRET
JOHN J. TOMCIK

INVENTORS
ADOLPHE A. D'AUDIFFRET
JOHN J. TOMCIK

United States Patent Office 3,312,284
Patented Apr. 4, 1967

3,312,284
APPARATUS FOR CLEANING INFILTRATION TYPE WATER COLLECTOR
Adolphe Aloys d'Audiffret, Westerville, and John J. Tomcik, Columbus, Ohio, assignors to Aqua Ran Water Supplies, Inc., Columbus, Ohio, a corporation of Ohio
Filed Oct. 9, 1963, Ser. No. 314,963
11 Claims. (Cl. 166—171)

This invention relates to water collectors of the infiltration type and in particular to a method and apparatus for cleaning such collectors.

Water collectors of the infiltration type are disclosed, for example, in the D'Audiffret Patent No. 2,740,476 and comprise, generally, a water-tight caisson sunk vertically into the earth through a water bearing stratum and from which water infiltrates into the caisson through perforated pipes extending radially outwardly from the caisson and provided with valved inner ends through which the water flows into the caisson.

On occasion, collectors of this nature have perforated or screened pipes extending from the caisson outwardly into a body of water such as a river and water will flow into the caisson in this case also by gravity. In either event, pumping means extends into the caisson and pumps the water therefrom to a point of use. Such collectors have extremely high capacity and are highly efficient and can remain in operation for a long period of time at relatively high pumping rates.

In the case of the collector having perforated or screened pipes extending laterally into the earth, the region surrounding the screened pipes is developed at the time of installation by washing therefrom mud and fine sand so that a filtering aquifer bed is provided surrounding each screened pipe. Such an aquifer bed, under many circumstances, will remain in highly efficient operating condition for a long period of time, but there are also occasions when the beds will become contaminated with foreign matter carried thereto by water being taken into the caisson. This foreign matter can take the form of mud or fine sand or it can take the form of incrustation on account of chemicals deposited in the aquifer bed from the water, or both. When these deposits reach the point that the yield of the collector is reduced any substantial amount, it becomes necessary for the deposits to be removed to restore the collector to good operating efficiency. This is a difficult task and it is in connection with methods and devices directed to this particular purpose that the present invention is concerned.

In the case of a collector having a screen pipe extending into a body of water such as a lake or river, there is a tendency for foreign matter such as twigs and leaves and the like to collect on the screen pipe and thus reduce the yield of the collector. In this last mentioned case, it has heretofore been the practice to remove these pipes and bring them to the surface and scrape the deposits and incrustation therefrom and to replace the pipes to restore the collector to good operating efficiency. Such an operation is, of course, expensive and involves some degree of hazard to personnel because divers are employed to remove and replace the pipes.

The present invention is also concerned with the adaptation of the method and devices of the present invention to the treating of screen pipes of this nature and also to restore the pertaining collector assembly to high operating efficiency.

With the foregoing in mind, a primary object of the present invention is the provision of a method and apparatus for cleaning water collectors of the infiltration type.

Another object of this invention is the provision of a method and apparatus for cleaning the screen pipes of infiltration water collectors in situ efficiently and with economy.

Still another object of this invention is the provision of a method and apparatus for cleaning the aquifer beds surrounding the screen pipes of infiltration type water collectors, which represents an improvement over heretofore known methods and devices for cleaning the said aquifer beds, either at the time of installing the collector for the original development of the beds or at a subsequent time to remove accumulated deposits from the aquifer beds.

The foregoing objects and advantages of the present invention as well as others will become more apparent upon reference to the following specification taken in connection with the accompanying drawings, in which:

FIGURE 7 is a fragmentary sectional view showing how the cleaner head of FIGURE 4 could be provided as a shearing blade to cut off twigs and the like.

Figure 1:
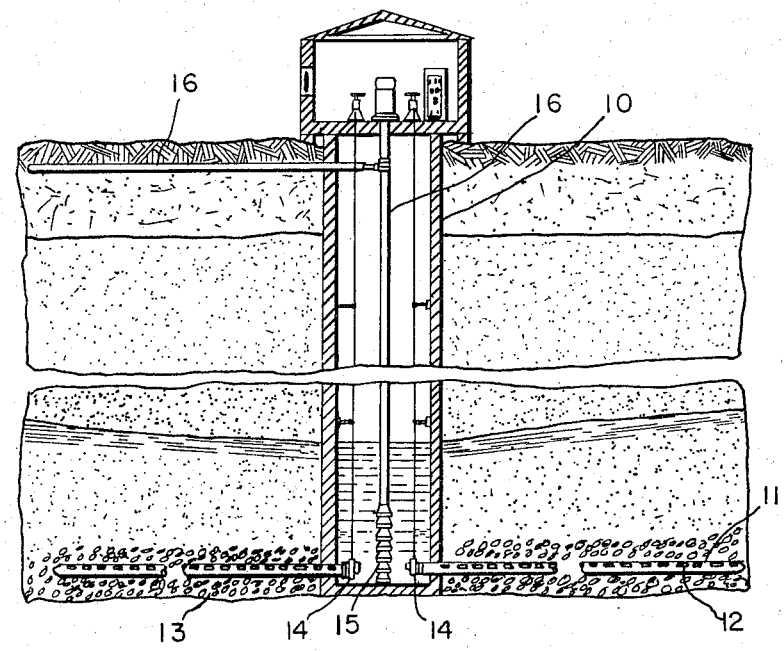
FIGURE 1 is a somewhat schematic view showing an infiltration type water collector having laterally, radially extending screen pipes disposed in aquifer beds, which are adapted for being cleaned according to the present invention.

Referring to the drawings somewhat more in detail, a collector according to the present invention comprises a concrete caisson 10 sunk vertically into the ground to intersect one or more water bearing levels in the earth. At one or more water bearing levels, the caisson is provided with laterally and radially extending screen pipes 11, which may extend outwardly from the caisson a distance of 200 to 400 feet. The caisson itself is usually around 13 feet in diameter and may extend downwardly into the earth a distance of 100 feet or more.

Screen pipes are usually about 8 inches in diameter and are provided with slots 12 through which water infiltrates by gravity through the surrounding aquifer bed 13 into the pipes whence the water flows through gate valves 14 into the caisson. The water is then pumped into the caisson by pump means 15 extending into the caisson to a pipe 16 leading to the point of use of the water.

The aquifer bed 13 surrounding each screen pipe is developed at the time of projecting the pipes from the caisson to remove fine material therefrom so that the aquifer bed is relatively open, consisting of gravel adjacent the pipe and graduating off to gravel and sand farther from the pipe so that the water flowing into the pipe is filtered and is, therefore, clean and is usually quite pure.

After a period of use, however, it may be many years, aquifer beds of this nature, at least in certain regions, may become partially obstructed by fine material conveyed thereto by the inflowing water. It is important that this material be removed to restore the well to operating efficiency.

A way of doing this is shown in the above mentioned D'Audiffret Patent No. 2,740,476, but this method and the apparatus shown for practicing the method has certain pronounced defects that are overcome by the present invention.

The aquifer beds are cleaned, in brief, by inserting in the screen pipe a cleaner unit of relatively short length through which air under pressure can be supplied, which will agitate the aquifer bed surrounding the screen pipe in the region of the cleaner, thus dislodging foreign matter from the aquifer bed which will then be carried into the screen pipe by water when the air pressure is cut off from the cleaner.

Figure 2:
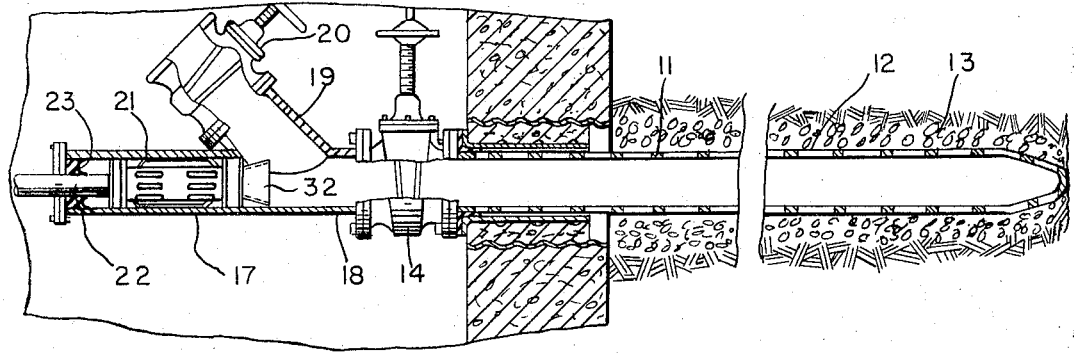
FIGURE 2 is a longitudinal section through a screen pipe drawn at somewhat enlarged scale and showing a flushing fitting connected to the screen pipe and a cleaner device according to the present invention therein.
Figure 3:
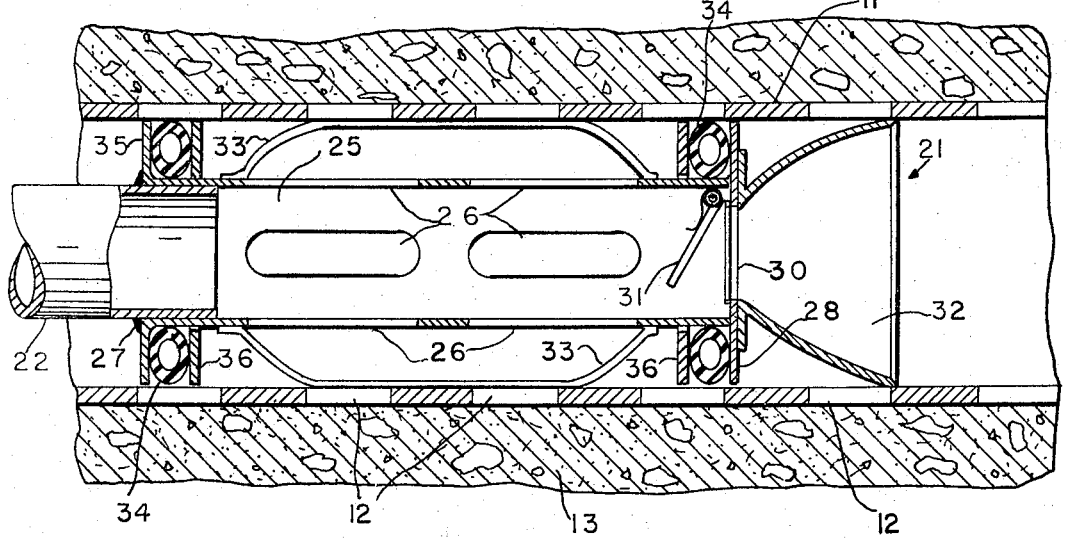
FIGURE 3 is a fragmentary sectional view through the screen pipe and cleaner device drawn at still larger scale showing expansible seals associated with the cleaner device and a pick-up scoop on the front end of the device.

The described arrangement for cleaning or developing the aquifer bed will be seen in FIGURES 2 and 3.

As will be seen in FIGURE 2, the valve 14 has bolted thereto a flushing fitting 17 which has a branch 18 coaxial with screen pipe 11 and of about the same size and an angular branch 19 provided with a valve 20. Disposed reciprocably in branch 18 is a cleaner head 21 to which is connected a sand line 22 that extends reciprocably through seal 23 at the outer end of branch 18. It will be understood that the sand line 22 is made up as the cleaner head is projected into the screen pipe so that the outermost limits of the screen pipe can be reached even though the caisson is only about 13 feet in diameter. The same pipe is then taken down as the cleaner head is retracted.

The flushing fitting 17 is connected to valve 14 by closing the valve 14 and pumping the caisson down to a low level whereupon workmen can enter the caisson and connect the flushing fittings to the valves 14. The valves 20 of branches 19 are closed, whereupon valves 14 can be opened and this will open the screen pipe to permit the cleaner heads 21 to be moved outwardly in the screen pipes.

As will be seen in FIGURE 3, which shows the cleaner head in the screen pipe, the cleaner head comprises a central tubular part 25 having slots 26 with the tubular part being secured to the end of sand line 22 as by welding 27. The extreme right end of tubular element 25 is closed by a plate 28 having a large central aperture 30 closed by the inwardly swinging check valve 31. Extending rightwardly from plate 28 is a scoop like element 32 which is freely slidable within the screen pipe, being made of rubber or plastic, which serves to direct sand and mud or other material that may be deposited in the pipe into the aperture 30 and the inside of tubular member 25 from where this material will pass through the sand line 22 into the caisson. The scoop member 32 is particularly important because it was found with the arrangement of the patent referred to that the accumulations within the pipe interfered with movement of the cleaner head and were sometimes extremely difficult to remove. Also, with the cleaner head of the patent, the plate on the outer end of the cleaner head was apertured and this permitted loss of air pressure from inside the cleaner head, which is prevented according to the present arrangement by the provision of the check valve 31.

At this point, it will be understood that the end of the sand line in the caisson is arranged so that air under pressure can be supplied thereto for agitating the aquifer bed or the air supply line can be disconnected, and when so disconnected, water can flow from the aquifer bed into the cleaner head and thence through the sand line into the caisson and this water can then be pumped from the caisson.

In the cleaner head, according to the prior patent, it was attempted to employ sliding seal elements for sealing the opposite ends of the cleaner head to the inside of the screen pipe. The pipes, however, are somewhat irregular on the inside and there are also accumulations of foreign matter and sometimes incrustations therein that make it quite difficult to move the cleaner head in the screen pipe if the seals engaged the inside of the screen pipe to an effective degree. The arrangement of the former patent thus proved to present considerable difficulty and labor in adjusting the cleaner head in the screen pipe and sometimes the cleaner heads would break off from the sand line and this would, of course, create a difficult problem and entail the loss of a great deal of valuable time.

The present invention has solved this difficult problem by employing expanding seals on opposite ends of the cleaner head which permit free movement of the cleaner head within the pipe, but which, when air pressure is supplied to the cleaner head, expand within the pipe and provide a seal of the cleaner head in the pipe much more effective than was ever possible with the prior arrangement.

The present invention also has yieldable slide elements that yieldably hold the cleaner head on the axis of the pipe so that the cleaner head is freely movable in the pipe when the seals are not expanded.

The construction referred to above will best be seen in FIGURE 3, wherein the resilient slide elements are represented at 33 and which may take the form of spring like strips, spaced circumferentially about the cleaner head and yieldably bearing against the inside of the screen pipe. The expansible seals can take various forms, but in FIGURE 3 are shown to be hollow rubber like rings 34, arranged at opposite ends of the cleaner head. One of these rings bears against plate 28 and the other ring bears against a ring 35 disposed at the other end of the cleaner head and fixed to tubular member 25. Toward the inside of the cleaner head, each hollow seal ring 34 is provided with a pressure ring 36 reciprocable on the cleaner head. The arrangement is such that when air pressure is supplied through sand line 22 to the cleaner head, check valve 31 will close and the pressure supplied will tend to force rings 36 outwardly, thereby expanding hollow seal rings 34 into sealing engagement with the screen pipe. The air pressure employed is on the order of 100 pounds per square inch and it has been found that extremely effective sealing of the cleaner head to the screen pipe is had while cutting off of the air pressure permits the seal rings to collapse, whereupon the cleaner head becomes freely movable within the screen pipe.

A cleaning or developing operation is carried out by pushing the cleaning device in various successive positions along the screen pipe and developing or cleaning each portion of the aquifer bed by first supplying air pressure to the cleaner device, and then cutting off the air pressure and permitting water to drain through the cleaner device back into the caisson. At the end of the cleaning operation the cleaner head is retracted into the fitting, valves 14 are closed, the caisson is pumped down, the flushing fittings are removed and the valves 14 are again opened, and the collector is back in operation.

Figure 4:
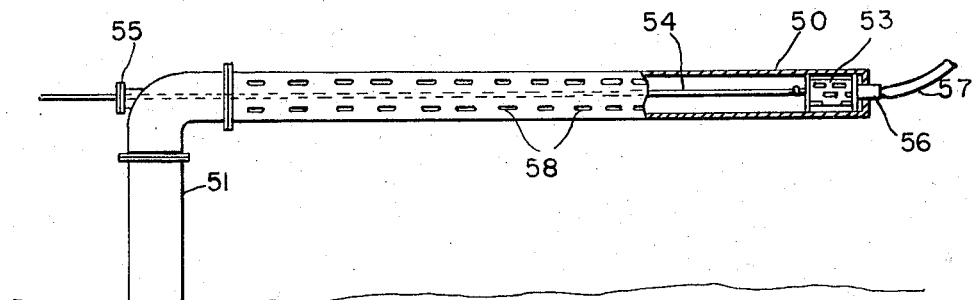
FIGURE 4 is a view somewhat diagrammatic in nature showing a cleaner device according to the present invention and a method of operation thereof wherein the screen pipe being cleaned is located in a body of water rather than in the earth.
Figure 7:
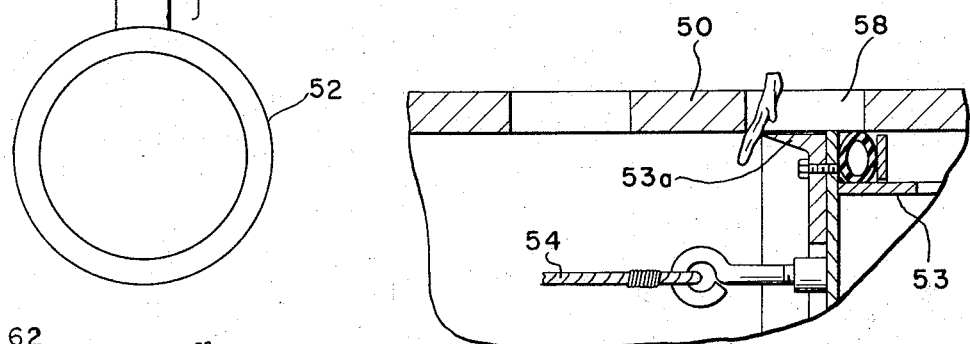

FIGURE 4 shows the practice of the present invention in connection with the collector where the screen pipe is disposed in a body of water, a river for example.

In FIGURE 4 the screen pipe is designated 50 and it is connected by an imperforate pipe system 51 with a caisson 52. Pipe 50 may be as much as 4 feet in diameter and up to 40 feet long and is provided with slots about one quarter inch wide by 3 inches long. These pipes are generally removed from the body of water for cleaning when necessary, but according to this invention are cleaned in situ by the use of a cleaner head 53 in the pipe which is similar to the cleaner head previously described. Cleaner head 53 remains in the screen pipe and has connected to one side cable 54, which extends sealingly through pipe system 51 as indicated at 55. The cable permits the cleaner head to be drawn axially through the pipe in one direction, and during this movement of the cleaner head, air pressure is supplied to the interior thereof through a fitting 56 forming a part of the cleaner head and to which a flexible air hose 57 can be connected. When the cleaner head is in the outer end of screen pipe 50, fitting 56 extends through the end of the screen pipe, but when the cleaner head is pulled through the screen pipe by cable 54, air hose 57 is pulled along therewith and is pulled into the pipe through the end of the screen pipe so that air is supplied continuously to the cleaner device. The hose is availed of for drawing the cleaner head back to the outer end of the pipe and air may be supplied to the cleaner head during this retracting movement also. The supply of air to the cleaner head as it goes along the screen pipe, preferably in steps, blows leaves, sticks and other debris from the openings 58 in the screen pipe and the screen pipe is thus cleaned in situ.

Figure 6:
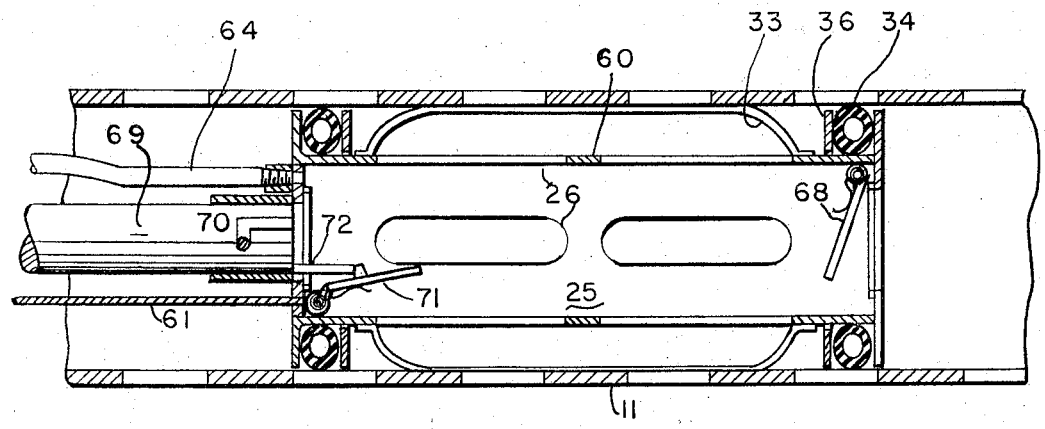
FIGURE 6 is a sectional view of the cleaner head of FIGURE 5 drawn at enlarged scale.
Figure 5:
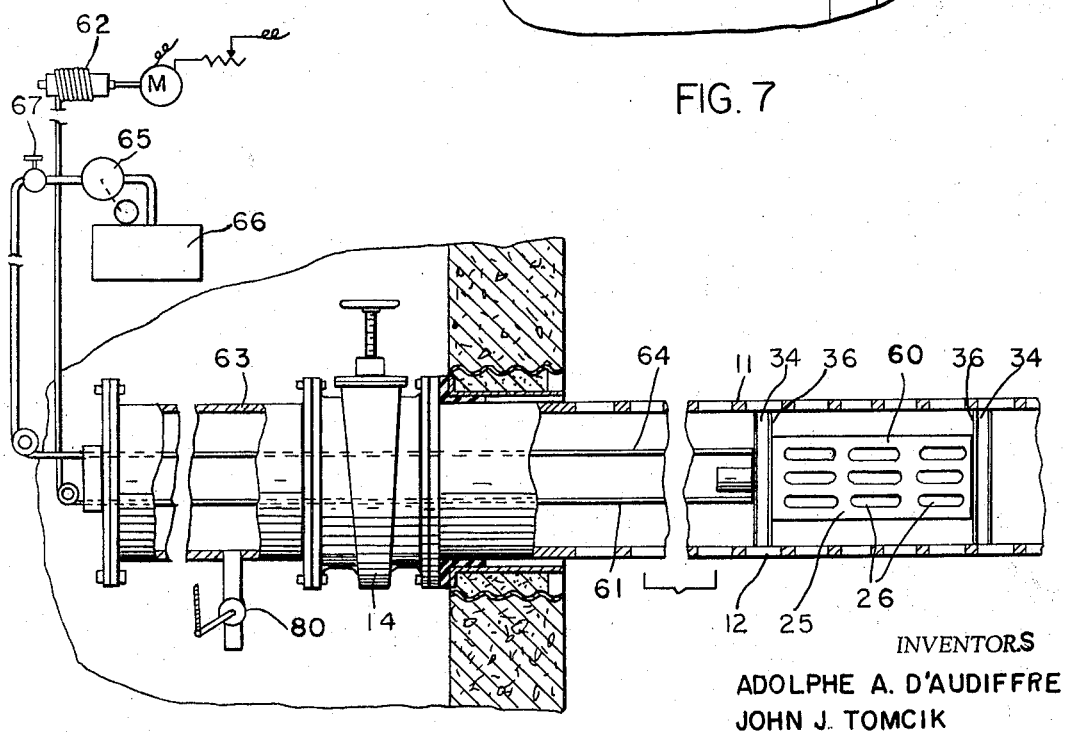
FIGURE 5 is a schematic view showing the arrangement according to the present invention when employed for treating aquifer beds chemically.

FIGURES 5 and 6 show an arrangement for chemically cleaning a screen pipe and aquifer bed when this sort of treatment is required to remove deposited encrustations.

In FIGURE 5, it will be seen that the cleaner head 60 has attached thereto a cable 61 leading to a motor driven winch 62 so that the cleaner head can be drawn from the outer end of the screen pipe back into the flushing fitting 63. Also connected to the cleaner head is a hose 64 leading to a pump 65 adapted for drawing chemical from a reservoir 66 and discharging it through control valve 67 to the hose 64.

As will be seen in FIGURE 6, the cleaner head 60 has a check valve 68 at the outer end corresponding to check valve 31 of FIGURE 3 so that sand and other material can pass into the end of the cleaner head and thence into sand line 69 connected to the other end of the cleaner head. According to the modification of FIGURES 5 and 6, sand line 69 is detachable from the cleaner head as by being connected thereto by a bayonet lock 70 or the like. This arrangement permits the cleaner head to be manipulated in the screen pipe in the same manner as previously described for effecting mechanical cleaning of the pipe and the aquifer bed. For chemical cleaning of the pipe and aquifer bed, however, the sand line is removed and the cleaner head is thereafter manipulated by the aforementioned cable 61.

The cleaner head at the end opposite check valve 68 has a second check valve 71 that is held in open position by abutment means 72 when the sand line is in place. Removing of the sand line from the cleaner head, however, permits check valve 71 to close and this, together with check valve 68 closes the inside of the cleaner head so that chemical supplied thereto through hose 64 will flow radially outwardly through the openings in the screen pipe and into the aquifer bed.

In practicing the chemical cleaning of an aquifer bed, the bed may first be mechanically cleaned in a manner previously described and thereafter, a cleaner head is moved by its pertaining sand line to the outermost end of the pertaining screen pipe. The several sand lines are then removed from the screen pipes leaving only the cleaner head in each of the pipes with the aforementioned cables and hoses connected thereto. The opening in the flushing fitting through which the sand line extended may at this time be closed.

The collector is now left idle until the caisson fills up to the level of the water surrounding the caisson so that there is substantially no static pressure differential existing along the screen pipes. The cleaner heads are then supplied with chemical under pressure, which may be an acid or caustic soda or the like, and the heads are retracted along their respective screen pipes back into their respective flushing fittings. The supply of chemical to each cleaner head is adjusted relative to the movement of the cleaner head along the screen pipe to cause the chemical to penetrate the surrounding aquifer bed the desired amount. Inasmuch as there is no static pressure differential existing in the aquifer beds, the chemical will tend to remain in position and will thus react with the incrustations to be removed. With the chemical saturating the aquifer beds, the collector stands idle for a day or so to give the chemical reaction sufficient time to be completed.

Thereafter, a valve such as the small valve illustrated at 80 in FIGURE 5 is opened and this will permit one of the laterals or screen pipes to drain into the caisson. The caisson is then pumped out, while the said lateral continues to drain until the atmosphere in the caisson is pure enough that workmen can enter the caisson. At this time the valves 14 will be closed and the several flushing fittings and the cleaning devices therein can be removed from the caisson. The workmen then leave the caisson, the valves 14 are again open and the caisson is pumped out until the chemical and the reaction products of the chemical and incrustations have all been removed from the aquifer beds and the caisson. The collector is now restored to efficient operation and can be put back into service.

It will be understood that the cleaner head of FIGURES 5 and 6 could have a scoop 32 on the front and if so desired.

It will also be understood that the cleaner head of FIGURES 5 and 6 would preferably be provided with the expanding seals shown and that the pressure of the chemical supplied, which will be on the order of 100 pounds per square inch or so, would cause expansion of these seals.

If the chemical employed were an acid, the seals would be acid resistant and the cleaner head itself could be coated with an epoxy resin or the like to resist attack by the acid.

Inasmuch as the arrangement of FIGURE 4 will often find the pipe submerged in a body of water such as a river or the like is apt to contain leaves and twigs and other debris, it occurs that twigs and the like will sometimes extend through the openings 58 of the pipe 50, and these can interfere with the movement of the cleaner head, and it is therefore proposed by the present invention that the cleaner head 53 be provided with an annular cutter element 53a on the leading side which, when the cleaner head is drawn through the pipe by the cable 54, will seal off twigs and debris without imposing any severe load on the cable. The cut off ends of the twigs and the like inside the pipe will be flushed on through the system, and those remaining in the apertures would be blown outwardly as the cleaner head advances past them.

Figure 8:
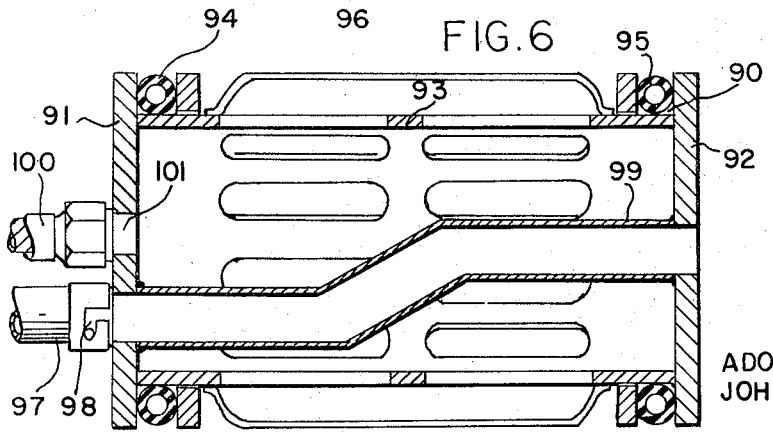
FIGURE 8 is a sectional view through a modified cleaner head particularly adapted for chemical cleaning-out operations.

As to the chemical cleaner operation, this has been discussed in particular in connection with FIGURE 6, but another possibility presents itself when the cleaning operation to be carried out is principally of a chemical nature and does not involve the removing of a great amount of fines and the like from the aquifer bed. When the cleaning is more or less simply chemical, it suffices to advance a head into the pipe and to saturate the aquifer bed with the chemical without providing means for flushing out the aquifer bed to remove fines therefrom. A modified arrangement for carrying out straight chemical cleaning is shown in FIGURE 8 wherein the cleaner head is indicated at 90 and consists of end plates 91 and 92 connected by perforated sleeve 93 and adjacent the aforementioned plates are the expansible seal rings 94 and 95 and the same as previously described. The head can also comprise the resilient skid elements 96 also as previously described.

The sand line of the pipe 97 is detachably connected to the head as by the bayonet joint 98, and there is a single conduit 99 extending through the device by means of which the sand line communicates with the space ahead of the device so that sand and other debris ahead of the device can pass through conduit 99 and be removed by way of the sand line. A scoop could, of course, be provided on the front end of the device.

The described arrangement eliminates any need for check valves or the like because the interior of the sleeve 93 is completely sealed off from the sand line. Chemical is supplied to the interior of the device by way of a hose 100 connected to fitting 101 that extends through plate 91. The hose is preferably steel reinforced and can be employed for pulling the device backwardly through the pipe in which it is located after the sand line has been disconnected. The chemical supplied, of course, expands seals 94 and 95 as has been described previously, and during movement of the device the pressure on the chemical is dropped so that the seals will counteract and the device can be easily shifted in the pipe to a new operative position.

It will be understood that this invention is susceptible to modifications in order to adapt it to different usages and conditions; and accordingly, it is desired to comprehend such modifications within this invention as may fall within the scope of the appended claims.

What is claimed is:

1. A device for cleaning screen pipes of water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, the other plate at the other end of the member also being apertured, and a check valve on the inside of the other plate swingable inwardly of said member to close the aperture in said other plate, said other plate having scoop means on the outside to scoop up material inside the screen pipe and direct it through the aperture in the said other plate and into the inside of said member.

2. A device for cleaning screen pipes of water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, the other plate at the other end of the member also being apertured, and a check valve on the inside of the other plate swingable inwardly of said member to close the aperture in said other plate, said conduit being detachable from said one plate, a check valve on the inside of said one plate to close the aperture therein, and means responsive to coupling of said conduit to said one plate for opening said check valve on said one plate.

3. A device for cleaning screen pipes of water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, said conduit being detachable from said one plate, and means connected to said one plate for moving the member in the screen pipe after the conduit is detached therefrom and also for supplying fluid to the inside of said member.

4. A device for cleaning screen pipes of water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, the other plate at the other end of the member also being apertured, and a check valve on the inside of the other plate swingable inwardly of said member to close the aperture in said other plate, said conduit being detachable from said one plate, and means connected to said one plate for moving the member in the screen pipe after the conduit is detached therefrom and also for supplying fluid to the inside of said member.

5. A device for cleaning screen pipes of water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, the other plate at the other end of the member also being apertured, and a check valve on the inside of the other plate swingable inwardly of said member to close the aperture in said other plate, said conduit being detachable from said one plate, a check valve on the inside of said one plate to close the aperture therein, and means responsive to coupling of said conduit to said one plate for opening said check valve on said one plate, means connected to said one plate for moving the member in the screen pipe after the conduit is detached therefrom and also for supplying fluid to the inside of said member.

6. A device for cleaning screen pipes of water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, said conduit being detachable from said one plate, and means connected to said one plate for moving the member in the screen pipe after the conduit is detached therefrom and also for supplying fluid to the inside of said member, said means connected to said one plate comprising a hose strong in tension and forming a single element to supply fluid to said member and also for pulling the member along the pipe being treated.

7. A device for cleaning screen pipes for water collectors comprising; a tubular perforated member substantially smaller in diameter than the inside of said screen pipe and receivable in the screen pipe, plates on opposite ends of the member smaller than the inside of the pipe, seal rings on the inner sides of said plates smaller than the inside of the pipe, resilient strips on said member for resiliently engaging the inside of the pipe to hold the member on the axis of the pipe, and means for expanding said rings into sealing engagement with said pipe in response to the supply of pressure to the inside of said member, the one plate at the one end of the member being apertured, a conduit connected to said one plate and communicating with the inside of said member via said aperture in said one plate, the other plate at the other end of the member also being apertured, and a check valve on the inside of the other plate swingable inwardly of said member to close the aperture in said other plate, said conduit being detachable from said one plate, and means connected to said one plate for moving the member in the screen pipe after the conduit is detached therefrom and also for supplying fluid to the inside of said member, said means connected to said one plate comprising a hose strong in tension and forming a single element to supply fluid to said member and also for pulling the member along the pipe being treated.

8. In combination; a pipe having lateral apertures therein for the flow of water into the pipe, and a cleaner device reciprocably mounted in the pipe comprising a hollow tubular perforated member substantially shorter than said pipe, plates on opposite ends of said member, seal means on the inner sides of said plates for sealing the ends of said member to the inside of the pipe, a cable connected to one plate and extending out one end of the pipe to draw the member along the pipe, and means on the other plate for connecting a hose thereto for supplying air under pressure to the inside of said member, said pipe being apertured at the end opposite said one end for reciprocably receiving said hose.

9. In combination; a pipe having lateral apertures therein for the flow of water into the pipe, and a cleaner device reciprocably mounted in the pipe comprising a hollow tubular perforated member substantially shorter than said pipe, plates on opposite ends of said member, seal means on the inner sides of said plates for sealing the ends of said member to the inside of the pipe, a cable connected to one plate and extending out one end of the pipe to draw the member along the pipe, and means on the other plate for connecting a hose thereto for supplying air under pressure to the inside of said member, said pipe being apertured at the end opposite said one end for reciprocably receiving said hose, an annular cutter member secured to said one plate and having a cutting edge adjacent the periphery of said device and pointing away from said device whereby movement of said device along the pipe will clip off debris extending through said lateral apertures into the pipe.

10. In combination; a pipe having lateral apertures therein for the flow of water into the pipe, and a cleaner device reciprocably mounted in the pipe comprising a hollow tubular perforated member substantially shorter than said pipe, plates on opposite ends of said member, seal means on the inner sides of said plates for sealing the ends of said member to the inside of the pipe, a cable connected to one plate and extending out one end of the pipe to draw the member along the pipe, and means on the other plate for connecting a hose thereto for supplying air under pressure to the inside of said member, said pipe being apertured at the end opposite said one end for reciprocably receiving said hose, said seal means being smaller in diameter than the inside of said pipe, and means responsive to the supply of air under pressure to the inside of said member for expanding said seals against said pipe.

11. In combination; a pipe having lateral apertures therein for the flow of water into the pipe, and a cleaner device reciprocably mounted in the pipe comprising a hollow tubular perforated member substantially shorter than said pipe, plates on opposite ends of said member, seal means on the inner sides of said plates for sealing the ends of said member to the inside of the pipe, a cable connected to one plate and extending out one end of the pipe to draw the member along the pipe, a hollow fitting projecting from the other plate to receive an air hose for the supply of air under pressure to the inside of said member, and a hole provided in other end of the pipe opposite said one end thereof to receive said fitting so the fitting projects from the pipe when said member is in an extreme position at said other end of said pipe so as to be accessible for connection thereto of said air hose.

References Cited by the Examiner

UNITED STATES PATENTS

| | | | |
|---|---|---|---|
| 1,469,949 | 10/1923 | Parker | 166—146 |
| 1,664,283 | 3/1928 | Boynton | 166—146 X |
| 2,151,416 | 3/1939 | Black et al. | 166—171 |
| 2,296,514 | 9/1942 | Gibson | 166—171 |
| 2,574,141 | 11/1951 | Brown | 166—191 X |
| 2,740,476 | 4/1956 | D'Audiffret et al. | 166—50 X |
| 3,022,827 | 2/1962 | Getzen | 166—43 X |
| 3,185,217 | 5/1965 | Brooks et al. | 166—42 |
| 3,199,598 | 8/1965 | Loomis | 166—147 |
| 3,208,528 | 9/1965 | Elliott et al. | 166—42 |

CHARLES E. O'CONNELL, *Primary Examiner.*

JACOB L. NACKENOFF, *Examiner.*

D. H. BROWN, *Assistant Examiner.*